United States Patent [19]

Bachel et al.

[11] Patent Number: 4,713,272
[45] Date of Patent: Dec. 15, 1987

[54] LONGITUDINALLY DIVIDED SLEEVE OF SHRINKABLE MATERIAL

[75] Inventors: Ernst Bachel, Geltendorf; Wolfgang Giebel, Planegg, both of Fed. Rep. of Germany

[73] Assignee: Siemens Aktiengesellschaft, Berlin and Munich, Fed. Rep. of Germany

[21] Appl. No.: 865,004

[22] Filed: May 20, 1986

[30] Foreign Application Priority Data

May 23, 1985 [DE] Fed. Rep. of Germany ....... 3518580

[51] Int. Cl.⁴ .............................................. B32B 1/08
[52] U.S. Cl. ........................................ 428/36; 428/99;
428/192; 428/910; 428/913; 138/169; 138/167;
174/92; 174/DIG. 8
[58] Field of Search .................... 428/99, 36, 192, 910,
428/913; 174/DIG. 8, 92; 138/167, 166

[56] References Cited

U.S. PATENT DOCUMENTS

| 3,455,336 | 7/1969 | Ellis . | |
|---|---|---|---|
| 4,280,258 | 7/1981 | Kunze | 174/DIG. 8 |
| 4,436,566 | 3/1984 | Tight | 174/DIG. 8 |

Primary Examiner—Alexander S. Thomas
Attorney, Agent, or Firm—Hill, Van Santen, Steadman & Simpson

[57] ABSTRACT

A longitudinally divided cable sleeve has a U-shaped clamp element which coacts with a flexible sheet of heat shrinkable material having a closure element formed along one longitudinal edge. The closure element has a base connected by a neck portion to a longitudinally extending bead around which a portion of the flexible sheet opposite the closure element is wrapped and held by assembling the clamping element thereon. Since the closure element coacts with any portion of the flexible material, the diameter of the sleeve can be matched to the diameter of the article being enveloped in the sleeve.

17 Claims, 5 Drawing Figures

LONGITUDINALLY DIVIDED SLEEVE OF SHRINKABLE MATERIAL

BACKGROUND OF THE INVENTION

The invention is directed to the longitudinal divided, hose-shaped envelope, particularly a cable sleeve, of a heat shrinkable material comprising a clamping closure mechanism that extends along the longitudinal edges of the sheet of material forming the envelope or sleeve with the clamping mechanism comprising a longitudinally extending bead connected by neck portion to one longitudinal edge of the sheet and having the sheet material adjacent the opposite edge wrapped therearound and held by a U-shaped clamp or clamping element.

An elongated, hose-shaped enveloping sheath or sleeve which is composed of heat shrinkable material and has a clamping closure mechanism along a pair of opposite longitudinal edges is disclosed in U.S. Pat. No. 3,455,336, which is incorporated by references thereto and was the basis of German AS No. 1,525,815. As disclosed in this patent, the closure mechanism was composed of an enlarged or bead-like formation along each of the edges and these bead-like formations are held together by a roughly formed U-shaped clamp when the sleeve is in the closed condition. These beads are located along each of the longitudinal edges so that the parting line will extend between the two beads when they are in the closed condition. However, this means that only a range of diameters defined by the respective circumferential length of the material between the beads and a degree of shrinkage in the material can be covered with a particular sleeve structure because only the portion of the sleeve extending between the two beads is shrinkable. Another disadvantage is that the optimum shrinking condition cannot always be achieved for various sleeve diameters occuring in practice because the shrinking must be executed to a respectively greater or lesser degree in accordance with the diameter of the object being enclosed within the sleeve.

THE SUMMARY OF THE INVENTION

The object of the present invention is to create a longitudinally divided hose-shaped envelope or sleeve such as a cable sleeve which can utilize the optimum shrinking conditions and can envelope articles of different diameters with a desired degree of shrinkage.

To accomplish these goals, the present invention is directed to a longitudinally divided sleeve of a shrinkable material comprising an elongated clamping element and a sheet of flexible heat shrinkable material having first and second longitudinal extending edges, said sheet of flexible material having a closure element extending along the first longitudinal edge, said closure element having a longitudinally extending bead portion connected by a narrow neck portion to an enlarged base portion, said bead and neck portion being adapted to receive a portion of the sheet of flexible material adjacent the second longitudinal edge to form a hose-like sleeve, said clamping element having a U shape with an inside profile matched to a profile of the bead and neck portions and being dimensioned to receive the bead with a portion of the sleeve wrapped around the bead of the closure element, said inside profile including at least one pair of longitudinally extending latching projections to hold the clamping element on the sheet of material wrapped around the bead portion as the clamping element is slipped thereon to complete the closure of the sleeve.

Up to now, common enveloping claddings or sleeves could only be utilized in defined shrinkage ranges because given rigidly arranged closure beads along the opposite longitudinal edges, the circumferential length of the shrinkable region between the two beads was a determining factor along with a specific degree of shrinkage. It was known that because of a given perscribed length of the shrinkable region, certain ranges of outside diameters could in fact be covered but that the shrinking could not always be optimally executed paricularly when the amount of shrinkage required was close to the maximum limit. These disadvantages are avoided with the longitudinally divided hose-shaped envelope in the present invention because a pre-matching with respect to the diameter of the sleeve to the diameter of the object can always be carried out as the sleeve is wrapped around the object. This means that respectively optimum shrinking conditions with respect to the shrinkage and the shrinking forces will occur and can be achieved on the basis of this pre-selection or matching. This is achieved in accordance with the invention because only one edge of the sheeted material forming the sleeve is provided with the closure element and the second or opposite longitudinal edge is free of a closure element and has the same thickness and/or profile as the remaining portion of the sheet. Thus, while applying the sheet to an object, the required length of the shrinkable middle part can be obtained with any excess portion of the sheet being subsequently removed as a nonused portion. This pre-matching to the enveloping diameter occurs by means of the application of the second longitudinal edge to the projection or bead portion of the closure element on the first longitudinal edge and ultimately by the fixing with the assistance of the U-shaped clamp which can be slipped in a clamping fashion over the wrapped around portion of the sheet forming the second longitudinal edge. Since an additional clamping in the closure region is affected between the clamp and the profile of the bead portion of the closure element during the stretching of the walls during the shrinking operation, this fixing by the clamp can insure a plurality of latchings so that the final clamping occurs during the shrinking. Appropriately embedments or inserts on the inside of the envelope will guarantee the required sealing effect and improve the adhesion of the enveloped article. The fixing of the clamp can be additionally facilitated with the assistance of a suitable tool having a correspondingly adapted pressure faces.

In the preferred embodiment, the closure element opposite the bead has a second bead for use in gripping while disassembling the closure. This second bead extends from the base and forms a concaved outer surface. The tool, which can be used for assembling the clamping element onto the first bead portion with the sheet wrapped therearound, preferably include a U shape arrangement having a pressure element on each of the legs of the U shape arrangement, each of the pressure members has a curve configuration and are positions relative to each other to cause a tapering or narrowing action. The curve configurations of the legs or pressure members are adapted with the facing surfaces having mating curves so one curve pressing surface engages the convex surface of the closure element as the opposite curve surface engages the convex surface of the clamping element.

DESCRIPTION OF THE PREFERRED EMBODIMENTS

Figure 1:
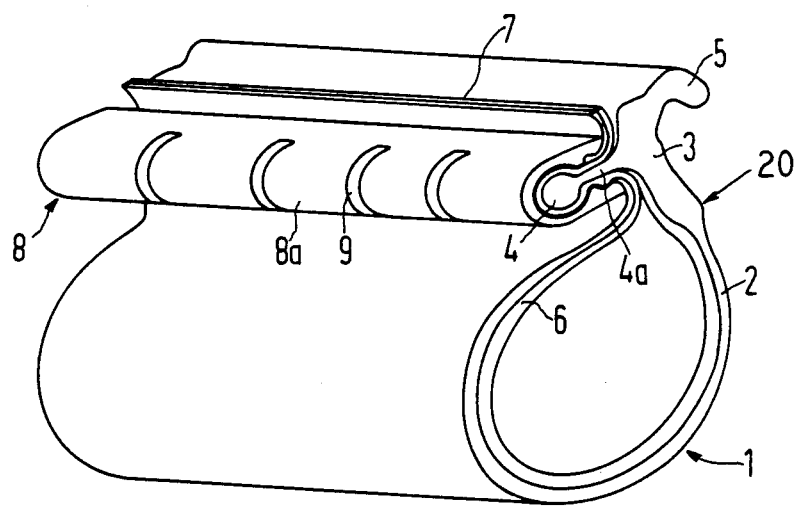
FIG. 1 is a perspective view of a longitudinally divided sleeve or envelope of the present invention in a closed position.

The principles of the present invention are particularly useful when incorporated into a longitudinally divided envelope or sleeve generally indicated at 1 in FIG. 1. The envelope or sleeve 1 is adapted to surround an arbitrary article such as at a location of a splice between cables. This sleeve 1 is essentially composed of a heat shrinkable sheet of material 2, which is wrapped around the article to be enveloped and has a longitudinally preceding closure element which is indicated at 20 and extends along one longitudinal edge, the element 20 coacts with an opposite or second edge portion 7 of the sheet 2 to form a closure region which is held closed by a longitudinally extending clamp generally indicated at 8.

The enclosure element 20 has a base portion 3 which is connected to a longitudinally extending bead 4 by a narrow neck portion 4a. The second edge of the sheet is wrapped around the bead 4 and the clamp 8 is pressed on this wrapped around portion 7 to hold it in tight engagement on the bead. The bead 4, the neck portion 4a as well as the remaining portions of the closure element 20 are formed of a material, which has a greater strength than the strength of the remaining portion or the sheet 2. Thus as the sheet 2 of the sleeve 1 is formed of a heat shrinkable material such as polyethylene, the closure portion 20 which is integral with the sheet 2 along the first edge can be strengthened by having a higher degree of cross-linking than the remaining portion of the sheet 2. This can be obtained by conventional manners such as either a chemical method of crosslinking or by exposing the selected portion to a radiation of various energy levels of electrons from an electron beam.

Figure 2:
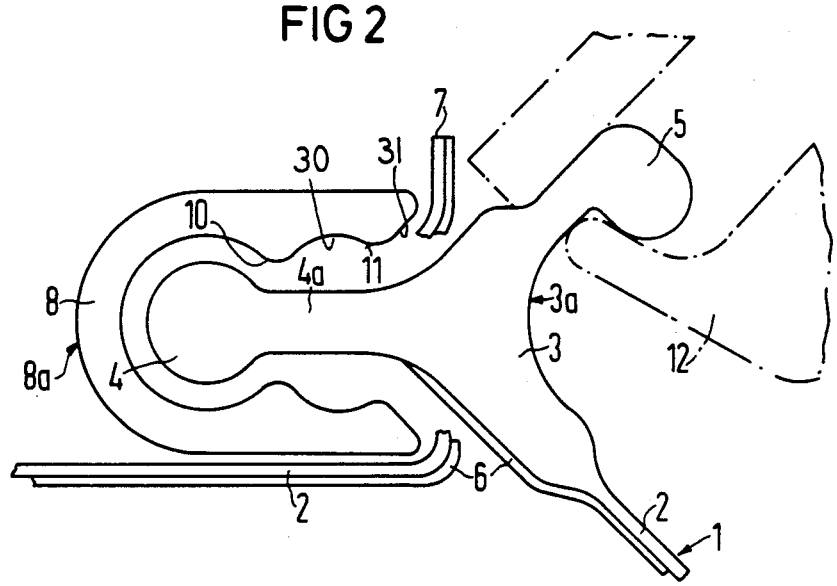
FIG. 2 is an enlarged partial end view with portions broken away for purposes of illustration of the closing region of the sleeve of FIG. 1.

As illustrated in FIGS. 1 and 2, the longitudinal closure element 20 also has a retaining bead 5, which extends in the opposite direction to the bead 4. In addition, an inner surface of the sheet 2 forming the sleeve 1 is provided with a coating 6 of thermally activated sealant for example, a commercially hot melt glue or adhesive.

The clamp 8 is basically a U-shaped clamping member or element which has an inside profile matched to a profile of the bead 4, neck portion 4a and that portion of the sheet wrapped therearound. To enable flexibility in a longitudinal direction, the clamp 8 has a plurality of slots 9 extending inward from an outer curve or convex surface 8a. The clamp 8 can be manufactured of metal for example, of a spring steel. It also can be made of a thermal setting plastic which is expediantly provided with a reinforcement such as with a fiberglass reinforcement.

In FIG. 2, the bead 4 has a button-like expansion extending from the narrow neck portion 4a which extends from the base 3 of the longitudinal closure element 20. The sheet portion 2 has been broken away in FIG. 2 in that area in which it would be engaged by the clamping element 8 to show the relationship between the outer profile of the bead 4 and neck portion 4a relative to the inner profile of the clamp 8. Thus it becomes clear, that the inner profile of clamp 8 is dimensions such that it conforms to the outer profile of the bead 4 and neck portion 4a and has dimension to enable the insertion of the sheet 2 therebetween.

As illustrated, the inner profile of the clamp 8 is provided with two pairs of ridges 10 and 11 on each of the legs of the U-shaped configuration. The inner pair 10 of ridges or latching projection are separated from the outer or second pair 11 by curves surface 30 and outward of the second pair ridges or latching projections 11 is a diverging throat portion 31. This configuration of curved cam surfaces extending to the projection or sides enables assembly while mounting the clamp onto the sheet material which is wrapped around the bead 4. The assembly occurs with the sheet being placed on the bead, the throat engaging the sheet and moving the clamp 8 so that the curve surfaces 30 are aligning to be basicly concentrate with the bead 4. This position which is the first latching position is relatively easily obtained without auxiliary means and thus enables assembly to the final position illustrated in FIG. 1 by using a suitable tool.

Figure 4:
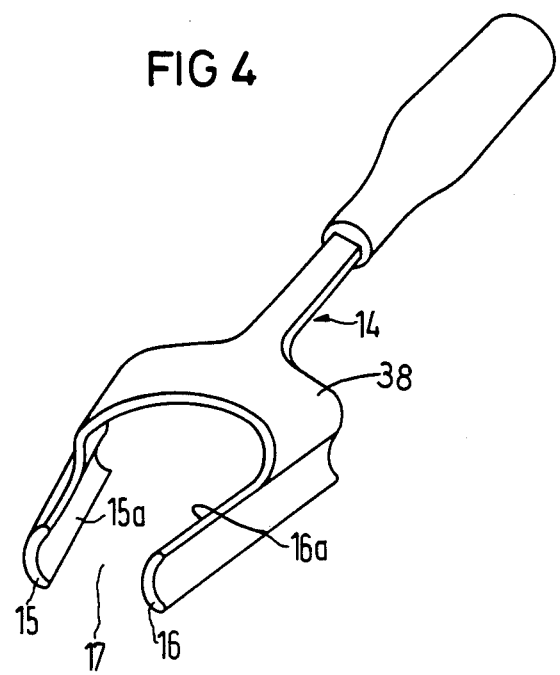
FIG. 4 is a perspective view of a tool for joining the clamping element onto the sleeve during a closing operation.

The outer surface, which is convex as well as a concave surface 3a of the closure element 20 form guide surfaces for closing tools which is illustrated in FIG. 4. The ultimate and tight fixing of the closing region finally occurs during a shrinking operation since the back formation of the shrinkable longitudinal edge yields a greater wall thickness which leads to an additional pressing of the longitudinal edge 7 between the clamp 8 and the outer surface of the bead and neck portions 4 and 4a. In this case, the sealant on the inside surface of the envelope or sleeve 1 is provided as a coating of hot melt glue and is placed around the outer profile of the bead 4 and neck portion 4a so that the sealing is also carried out in the closing region. Finally, it is indicated that the strengthened longitudinal edge 20 comprises a retaining bead 5 at its upper end which serves for the application of a stretching tool 12 (in chain lines) which is used during a widening and stretching operation and which retaining bead 5 can be removed from the closure element 20 as needed.

Figure 3:
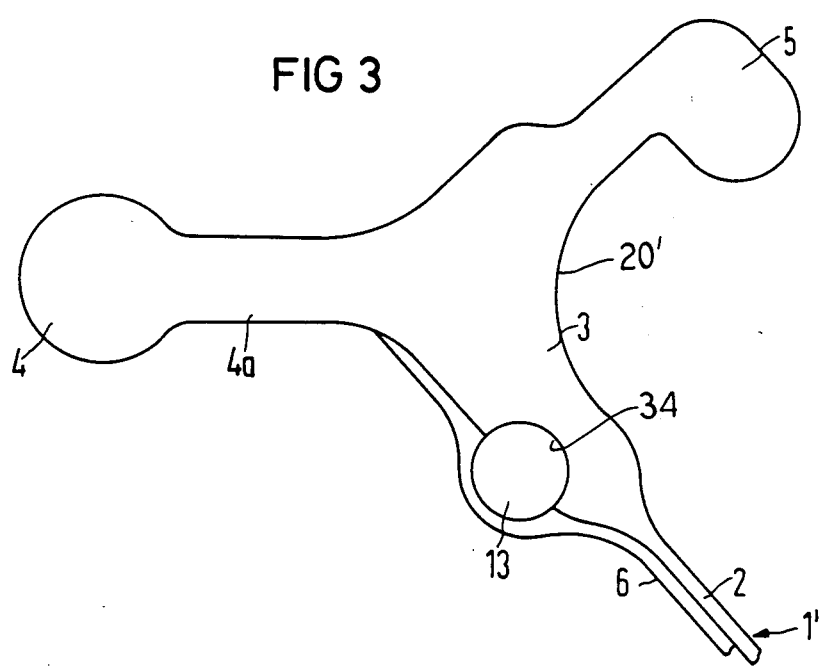
FIG. 3 is an enlarged end view of embodiment of the enclosure element of the sleeve of FIG. 1.

An embodiment of the sleeve is generally indicated at 1' in FIG. 3. In this embodiment, the closure element 20' has an addition embedment or member 13 of an excess amount of hot melt glue. In this embodiment, the member 13 of hot melt glue is embedded in a longitudinally extending channel 34 which is provided in the base 3 of the closure element 20'. As illustrated, an inside coating 6 is applied over the member 13 and will be activated by the action of heat during the shrinking operation. An elastic material may be utilized as the member 13 in the same way so that irregularities in the closing region can be compensated in a resiliant fashion.

As mentioned hereinabove, the clamping element 8 can be moved from a first latching position to the final position utilizing a tool. Such as tool is illustrated in FIG. 4 and is generally indicated at 14. The tool 14 has a U-shaped configuration with a connecting member 38 extending between two leg portions 15 and 16. Each of the leg portions 15 and 16 has a curved or crescent cross section to form pressure surfaces or faces such as 15a and 16a. The connecting portion 38 holds the two legs in a converging manner so that a space or throat 17 therebetween converges from a wide-mouth or wide portion to a narrower portion. The tool is utilized by positioning the legs or pressure members 15 and 16 with the surface 15a engaging the convex surface 8a of the clamp 8 and the surface 16a being received in a substantially concave surface 3a of the closure element 20. As the tool 14 is drawn along the closure region, the clamp 8 is pressed to its ultimate engagement as a consequence of the tapering mouth between the pressure surfaces 15a and 16a. After utilizing the tool to move the clamp to its closing position, the shrinking operation can occur.

Figure 5:
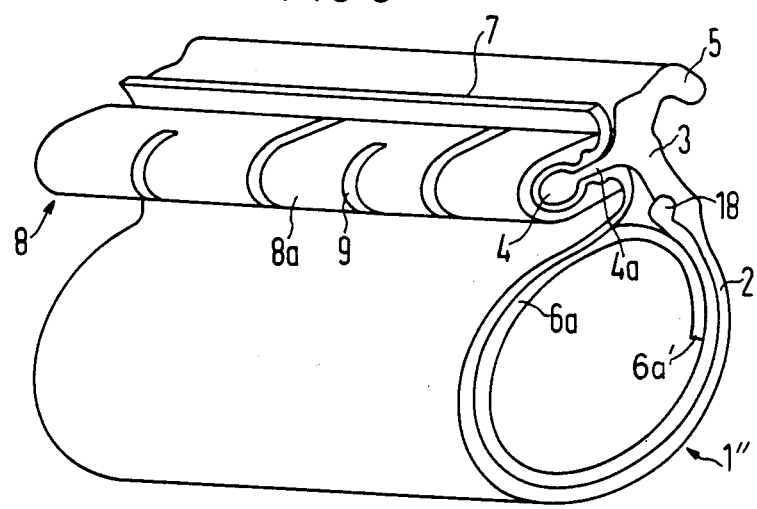
FIG. 5 is a perspective view of another embodiment of the sleeve or envelope of the present invention.

Another embodiment of the sleeve is illustrated at 1" in FIG. 5. In this embodiment of the sleeve, the adhesive layer is introduced as a separate adhesive foil 6a. It is expedient that one end 18 of the foil 6a is provided with a bead or an edge so it can be fixed in its principle position when enveloping an article. Given such an arrangement, the free ends 6a' can be lapped underneath the edge 18 as illustrated with the amount of lapping depending on the particular diameter of the sleeve 1". With such an arrangement, the adhesive foil 6a is not in the area of the closing region formed by the clamp 8, the end 7 and the bead 4. Thus, these elements will not be glued together. This is desirable when reopening the envelope is desirable.

As mentioned hereinbefore, the advantage of the sleeve of the present invention is that the sleeve can be manufactured with a fixed width. If the article to be enveloped is of a small diameter, then the portion of the sheet material which is engaged between the clamp and the bead 4 can be selected to obtain the desired diameter for the sleeve and any excess material extending beyond the clamp can be subsequently trimmed off. This enabled utilizing one type of sleeve for a wide variety of articles having different diameters.

Although various minor modifications may be suggested by those versed in the art, it should be understood that we wish to employ within the scope of the patent granted hereon, all such modifications as reasonably and properly come within the scope of our contribution to the art.

We claim:

1. A longitudinally divided sleeve of heat shrinkable material comprising an elongated, separate clamping element and a sheet of flexible heat shrinkable material having a first and second longitudinally extending edge, said sheet having a single longitudinally extending closure element extending along the first longitudinal edge, said closure element having a longitudinally extending bead portion connected by a narrow neck portion to an enlarged base, said sleeve being closed by said bead and neck portion having the sheet of flexible material adjacent the second edge wrapped therearound with said clamping element holding the wrapped around portion of the sheet on said bead, said clamping element having a U-shaped with an inside profile matched to a profile of the bead and neck portion and being dimensioned to receive the bead with a portion of the sheet wrapped around the bead to form a closure region, an inside profile of the clamping element including at least one pair of latching projections to hold the clamping element on the bead so that articles of different diameters can be enveloped by adjusting the diameter of the sleeve, and then using optimum shrinking of the sleeve.

2. A longitudinally divided sleeve according to claim 1, wherein the closure element is formed with a material having a higher strength than the strength of the remaining portion of the flexible sheet.

3. A longitudinally divided sleeve according to claim 2, wherein the closure element and the flexible sheet are of the same material and the closure element exhibits a higher degree of cross linking than the remaining portion of the flexible sheet to obtain the higher strength.

4. A longitudinally divided sleeve according to claim 1, which further includes an inside wall surface of the sleeve having a coating of a hot melt glue.

5. A longitudinally divided sleeve according to claim 4, wherein the closure element has an enbedment positioned between the coating of a hot melt glue and an inner surface of the base of the closure element.

6. A longitudinally divided sleeve according to claim 5, wherein the inner surface of the base has a longitudinally extending groove adjacent to the transition of the base to the flexible sheet of material for receiving the embedment.

7. A longitudinally divided sleeve according to claim 6, wherein said embedment is a glue member.

8. A longitudinally divided sleeve according to claim 6, wherein said embedment is a resiliant member to compensate for different spacing in the closure region.

9. A longitudinally divided sleeve according to claim 1, which includes an adhesive foil corresponding to the surface of the cable sleeve being arranged on the inside region of said cable sleeve, said adhesive foil having at least one edge secured to the base of the closure element.

10. A longitudinally divided sleeve according to claim 1, wherein said closure element includes a retaining bead extending from the base in a direction opposite from the first mentioned bead.

11. A longitudinally divided sleeve according to claim 1, wherein the bead has approximately a circular cross section with the diameter being greater than the thickness of the neck portion to form under cuts adjacent the intersection of the bead and neck portion.

12. A longitudinally divided sleeve according to claim 1, wherein the inner surface of the clamping element adjacent each of the latching projections has curved cam surfaces proceding to the heighth of each projection.

13. A longitudinally divided sleeve according to claim 12, which has two pairs of latching projections with a latching projection adjacent an open mouth of the clamping element having a greater spacing than the pair of latching projections spaced inward therefrom so that an initial latching of the clamping element onto the bead with the sheet wrapped therearound requires a smaller amount of pressure than the final clamping position.

14. A longitudinally divided sleeve according to claim 1, wherein the clamping element opposite a throat has a head part with a curved convex outer surface and a surface of the base of the closure element opposite the neck portion has a concave curve outer surface, said curve surfaces acting as guide surfaces for a closing tool.

15. A longitudinally divided sleeve according to claim 1, wherein said clamping element is composed of a metal preferrably spring steel.

16. A longitudinally divided sleeve according to claim 1, wherein the clamping element is composed of a thermal setting plastic reinforced with fiberglass.

17. A longitudinally divided sleeve according to claim 1, wherein said clamping element has a plurality of slots extending at right angles to the longitudinal direction and spaced there along to render the clamping element longitudinally flexible.

* * * * *